United States Patent
Nomura et al.

(10) Patent No.: US 8,914,199 B2
(45) Date of Patent: Dec. 16, 2014

(54) EXCAVATING MACHINE DISPLAY SYSTEM AND EXCAVATING MACHINE

(71) Applicant: Komatsu Ltd., Tokyo (JP)

(72) Inventors: Azumi Nomura, Fujisawa (JP); Masao Yamamura, Oita (JP); Daishi Iwanaga, Bungoono (JP); Etsuo Fujita, Hirakata (JP); Eiji Morinaga, Hirakata (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 13/981,947

(22) PCT Filed: Nov. 27, 2012

(86) PCT No.: PCT/JP2012/080600
§ 371 (c)(1),
(2), (4) Date: Jul. 26, 2013

(87) PCT Pub. No.: WO2014/054193
PCT Pub. Date: Oct. 4, 2014

(65) Prior Publication Data
US 2014/0099178 A1 Apr. 10, 2014

(30) Foreign Application Priority Data

Oct. 5, 2012 (JP) .................................. 2012-223666

(51) Int. Cl.
*E02F 9/26* (2006.01)
*E02F 3/30* (2006.01)
*E02F 9/20* (2006.01)
*E02F 3/32* (2006.01)
*G01S 19/53* (2010.01)

(52) U.S. Cl.
CPC ... *E02F 9/26* (2013.01); *E02F 3/30* (2013.01); *E02F 9/2037* (2013.01); *E02F 3/32* (2013.01); *E02F 9/261* (2013.01); *E02F 9/264* (2013.01); *G01S 19/53* (2013.01)
USPC ............. 701/50; 701/408; 703/2; 340/995.27

(58) Field of Classification Search
CPC ................. E02F 9/20; E02F 9/26; E02F 3/30; E02F 9/264; E02F 9/2037
USPC ...................... 701/1, 34.4, 50, 408, 516, 538; 414/685; 703/2; 340/988, 989, 995.27
See application file for complete search history.

(56) References Cited

U.S. PATENT DOCUMENTS

| 5,713,144 | A | * | 2/1998 | Haraoka ........................ 37/348 |
| 2005/0027420 | A1 | | 2/2005 | Fujishima et al. |
| 2013/0158787 | A1 | | 6/2013 | Nomura et al. |

FOREIGN PATENT DOCUMENTS

| JP | 2003-056010 A | 2/2003 |
| WO | WO-2004/027164 A1 | 4/2004 |
| WO | WO-2012/114869 A1 | 8/2012 |

OTHER PUBLICATIONS

International Search Report dated Mar. 5, 2013, issued for PCT/JP2012/080600.

*Primary Examiner* — Russell Frejd
(74) *Attorney, Agent, or Firm* — Edwards Wildman Palmer LLP

(57) ABSTRACT

The display system of the excavating machine has a work machine condition detection unit which detects information related to a current position of an excavating machine and a processing unit. This processing unit calculates an icon display of the bucket and the positions of the excavation edge portions viewed from a top of the excavating machine based on the information related to the current position of the excavating machine, the information related to the posture of the main body, the information about the positions of the excavation edge portions and the outer shape information about the bucket, and displays on a screen of a display device the target surface, the icon display position of the bucket, and an image which indicates the positions of the excavation edge portions.

6 Claims, 13 Drawing Sheets

EXCAVATING MACHINE DISPLAY SYSTEM AND EXCAVATING MACHINE

FIELD

The present invention relates to an excavating machine display system and an excavating machine which includes this excavating machine display system.

BACKGROUND

Generally, an excavating machine such as an excavator excavates, for example, a ground of a working object when an operator who is operating personnel operates an operation lever to drive a work machine including a bucket. For example, Patent Literature 1 discloses a technique of detecting blade edge positions of a bucket, determining a relationship between an absolute position of an underground pipe and absolute positions of bucket blade edges and determining an excavation position and an excavation depth by a bucket by means of an excavation position/depth determination unit.

CITATION LIST

Patent Literature

Patent Literature 1: Japanese Patent Laid-Open No. 2003-056010

SUMMARY

Technical Problem

When part of a design surface of a construction work target is set as a target surface using an excavating machine such as an excavator to excavate a ground of a working object according to this target surface, an operator of the excavating machine needs information about relative positions of the target surface and bucket blade edges (excavation edge portion) in particular. The technique of Patent Literature 1 allows to learn the positions of the bucket blade edges (excavation edge portions) when viewed from a side. However, when the technique of Patent Literature 1 is used, if a bucket rotates through a bucket pin, the bucket blade edges (excavation edge portions) hide behind the bucket when viewed from the top. Further, the operator needs to estimate information about relative positions of a target surface and bucket blade edges (excavation edge portions) based only on positions of the bucket blade edges (excavation edge portions) which can be viewed from the side. Hence, the technique of Patent Literature 1 may not intelligibly provide positions of bucket blade edges (excavation edge portions) which follow rotation of the bucket.

An object of the present invention is to intelligibly provide positions of excavation edge portions which follow rotation of a bucket, to an operator when the operator of an excavating machine proceeds with construction work according to a design surface.

Solution to Problem

According to the present invention, a display system of an excavating machine, the excavating machine comprising a work machine which includes a bucket including an excavation edge portion and a main body which is attached to the work machine, the excavating machine display system comprises: a work machine condition detection unit which detects information related to a current position of the excavating machine, information related to a posture of the main body and information about a position of the excavation edge portion; a memory unit which stores position information about a target surface which indicates a design geography and outer shape information about the bucket; and a processing unit which calculates positions of the bucket and the excavation edge portion viewed from a top face of the excavating machine based on the information related to the current position of the excavating machine, the information related to the posture of the main body, the information about the position of the excavation edge portion and the outer shape information about the bucket, and displays on a screen of a display device the target surface, an image which indicates the bucket and an image which indicates the position of the excavation edge portion.

In the present invention, it is preferable that the processing unit displays at all times the image which indicates the position of the excavation edge portion, on the screen which displays the excavating machine from the top face such that a relative position of the excavation edge portion with respect to the image which indicates the bucket viewed from the top face of the excavating machine is intelligible.

In the present invention, it is preferable that the processing unit displays the image which indicates the position of the excavation edge portion as an image of a line segment which indicates the position of the excavation edge portion, and displays the image of the line segment which indicates the position of the excavation edge portion in a mode different from that of the image which indicates the bucket.

In the present invention, it is preferable that the line segment indicates a blade edge at the excavation edge portion.

According to the present invention, an excavating machine comprises the display system of the excavating machine.

The present invention can intelligibly provide positions of excavation edge portions which follow rotation of a bucket, to an operator when the operator of an excavating machine proceeds with construction work according to a design surface.

DESCRIPTION OF EMBODIMENTS

A mode (embodiment) for implementing the present invention will be described in detail with reference to the drawings. Content disclosed in the following embodiment by no means limits the present invention. Further, although an excavator will be described as an example of an excavating machine with the following embodiment, the excavating machine at which the following embodiment targets is by no means limited to the excavator as long as the excavating machine has an excavating or backfilling function.

<Entire Configuration of Excavating Machine>

Figure 1:
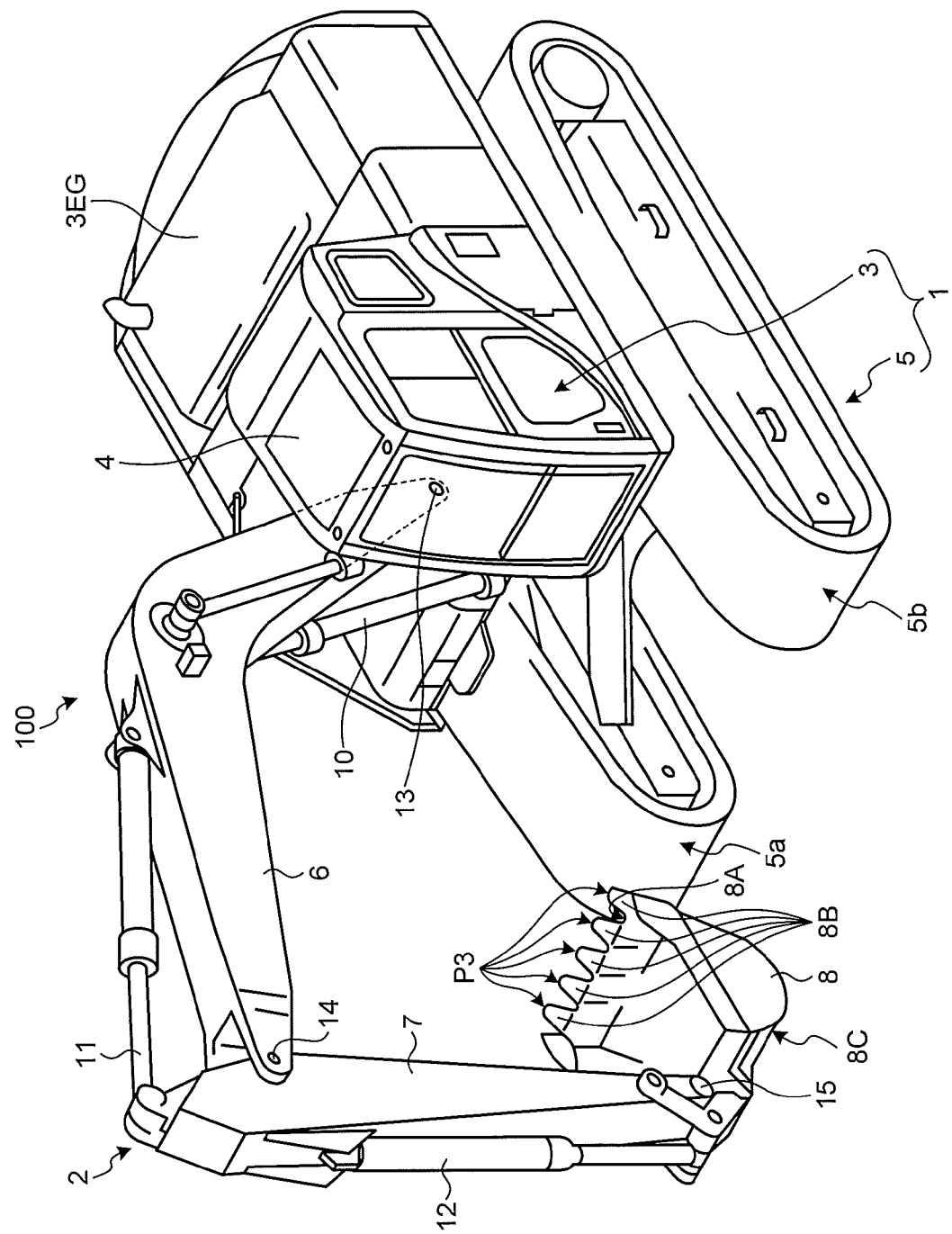
FIG. 1 is a perspective view illustrating an excavator 100 according to the present embodiment.
Figure 2:
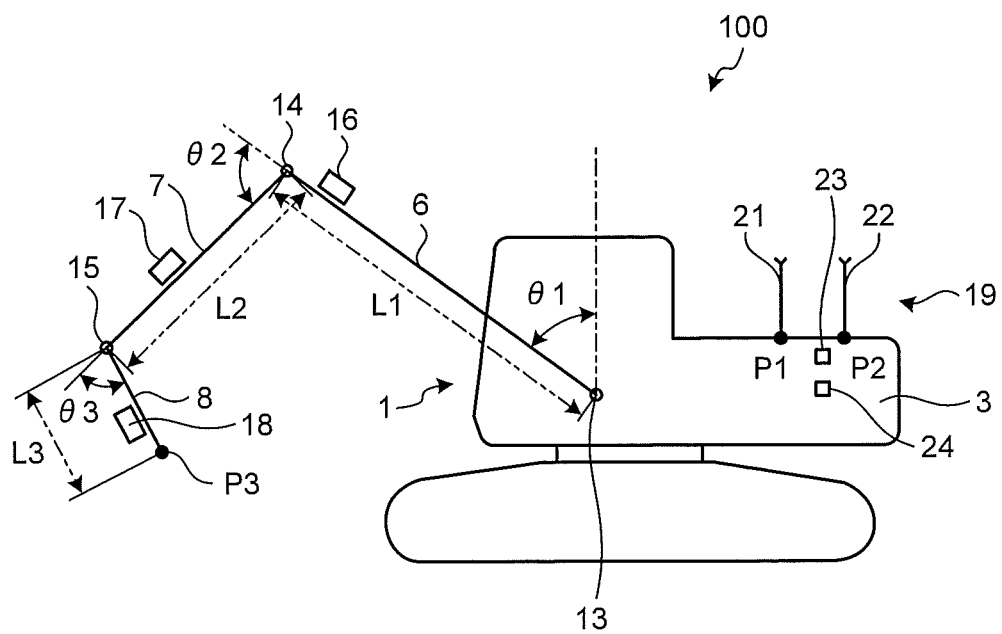
FIG. 2 is a side view of the excavator 100.
Figure 3:
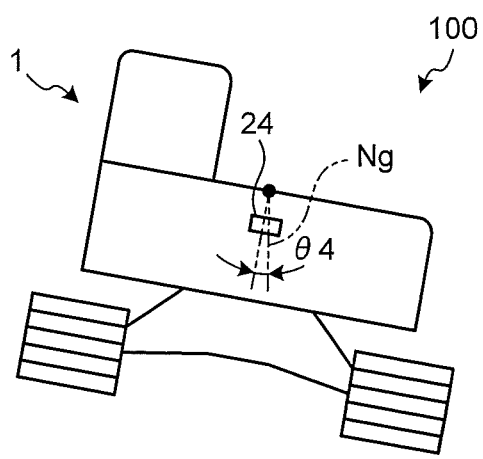
FIG. 3 is rear view of the excavator 100.
Figure 4:
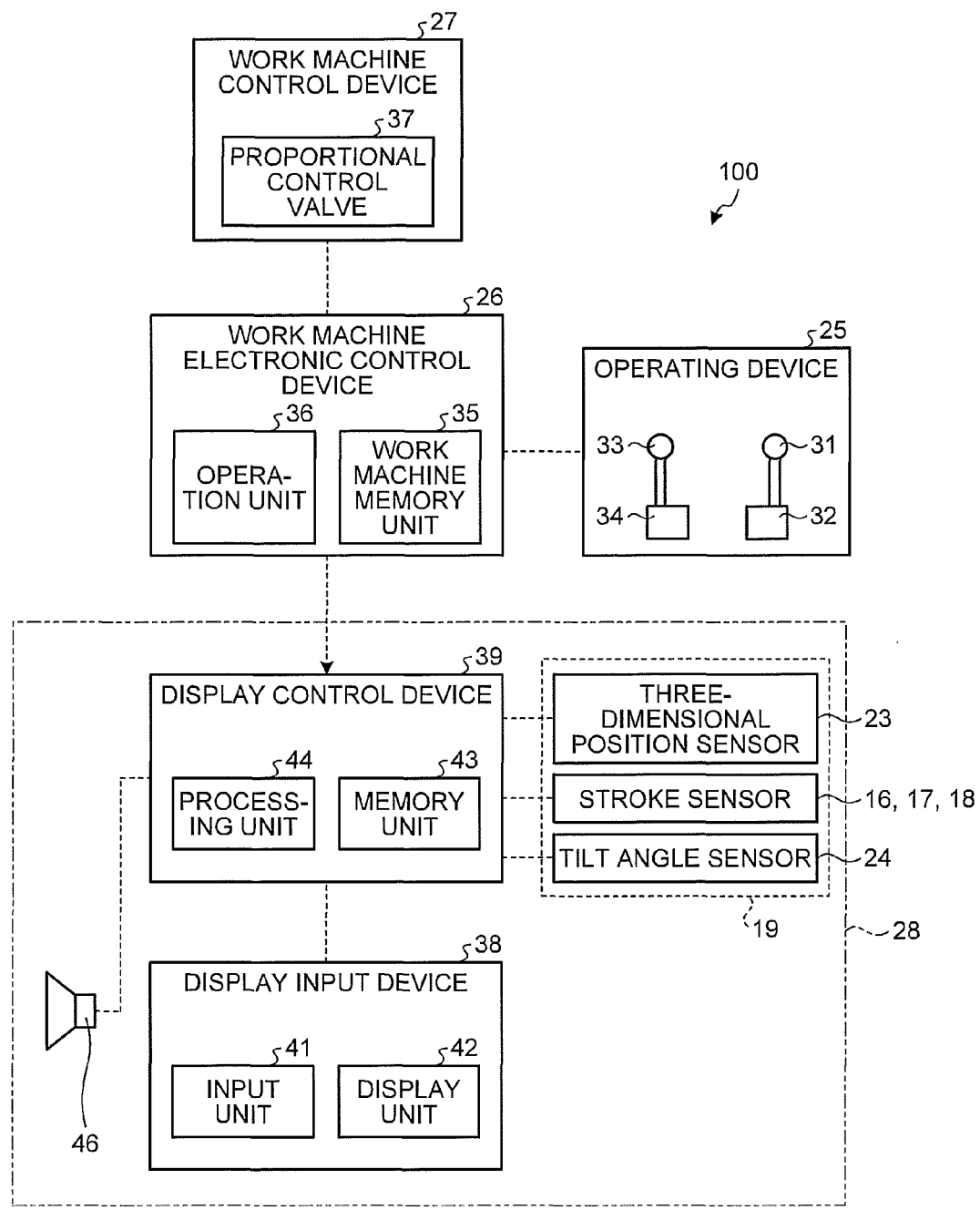
FIG. 4 is a block diagram illustrating a control system included in the excavator 100.
Figure 5:
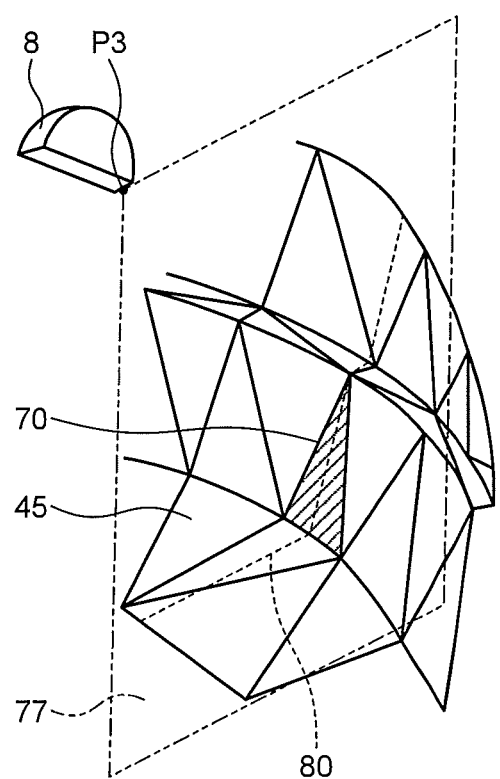
FIG. 5 is a view illustrating a design geography indicated by design geography data.

FIG. 1 is a perspective view illustrating an excavator 100 according to the present embodiment. FIG. 2 is a side view of the excavator 100. FIG. 3 is rear view of the excavator 100. FIG. 4 is a block diagram illustrating a control system included in the excavator 100. FIG. 5 is a view illustrating a design geography indicated by design geography data. In the present embodiment, the excavator 100 as an excavating machine includes a vehicle main body 1 which is a main body, and a work machine 2. The vehicle main body 1 includes an upper swing body 3 and a traveling device 5. Inside an engine room 3EG power generating device and a device such as a hydraulic pump which are not illustrated are accommodated. The engine room 3EG is arranged at one end side of the upper swing body 3.

Although the excavator 100 uses an internal-combustion engine such as a diesel engine as a power generating device in the present embodiment, the excavator 100 is not limited to this. The excavator 100 may be equipped with, for example, a so-called hybrid power generating device formed by combining an internal-combustion engine, a generator motor and an electric storage device.

The upper swing body 3 has a cab 4. The cab 4 is placed on the other end side of the upper swing body 3. That is, the cab 4 is arranged on an opposite side to a side on which the engine room 3EG is arranged. In the cab 4, a display input device 38 and an operating device 25 illustrated in FIG. 4 are arranged. These devices will be described below. The traveling device 5 has crawler tracks 5a and 5b. The traveling device 5 travels the excavator 100, and rotating the crawler tracks 5a and 5b. The work machine 2 is attached to the cab 4 of the upper swing body 3.

With the upper swing body 3, a side on which the work machine 2 and the cab 4 are arranged is the front, and a side on which the engine room 3EG is arranged is the rear. The left side when facing the front is the left of the upper swing body 3 and a right side when facing the front is the right of the upper swing body 3. Further, with the excavator 100 or the vehicle main body 1, the traveling device 5 side based on the upper swing body 3 is a lower side, and the upper swing body 3 side based on the traveling device 5 is an upper side. When the excavator 100 is placed on a horizontal surface, the lower side is a vertical direction, that is, a direction of application of gravity, and the upper side is an opposite side to the vertical direction.

The work machine 2 has a boom 6, an arm 7, a bucket 8, a boom cylinder 10, an arm cylinder 11 and a bucket cylinder 12. A base end portion of the boom 6 is swingably attached to a front portion of the vehicle main body 1 by means of a boom pin 13. A base end portion of the arm 7 is swingably attached to a front end portion of the boom 6 by means of an arm pin 14. To the front end portion of the arm 7, the bucket 8 is swingably attached by means of a bucket pin 15. To an edge portion 8A which is a concave portion of the bucket 8, blades (tooth members) 8B are attached. Front ends of the blades 8B are excavation edge portions P3 which produce an excavation force of the work machine 2. The blades 8B are not attached to the concave edge portions 8A of the bucket 8 depending on types of the bucket 8 and, in this case, the concave edge portions 8A of the bucket 8 are the excavation edge portions P3 which produce an excavation force. Further, a concave bottom portion of the bucket 8 is referred to as a "hip portion" 8C, and the work machine 2 can level a land by pressing the hip portion 8C against a ground surface.

As illustrated in FIG. 2, the length of the boom 6, that is, the length from the boom pin 13 to the arm pin 14 is L1. The length of the arm 7, that is, the length from the center of the arm pin 14 to the center of the bucket pin 15 is L2. The length of the bucket 8, that is, the length from the center of the bucket pin 15 to the excavation edge portions P3 of the bucket 8 is L3.

The boom cylinder 10, the arm cylinder 11 and the bucket cylinder 12 illustrated in FIG. 1 are hydraulic cylinders which are driven by pressure of operating oil (adequately referred to as a "hydraulic pressure" below). The boom cylinder 10 drives the boom 6 to move up and down. The arm cylinder 11 drives the arm 7 to rotate about the arm pin 14. The bucket cylinder 12 drives the bucket 8 to rotate about the bucket pin 15. A proportional control valve 37 illustrated in FIG. 3 is arranged between the hydraulic cylinders such as the boom cylinder 10, the arm cylinder 11 and the bucket cylinder 12, and hydraulic pumps which are not illustrated. A work machine electronic control device 26 which will be described below controls the proportional control valve 37 to control the flow rate of the working oil to be supplied to the boom cylinder 10, the arm cylinder 11 and the bucket cylinder 12. As a result, operations of the boom cylinder 10, the arm cylinder 11 and the bucket cylinder 12 are controlled.

As illustrated in FIG. 2, the boom 6, the arm 7 and the bucket 8 are provided with a first stroke sensor 16, a second stroke sensor 17 and a third stroke sensor 18, respectively. The first stroke sensor 16 detects a stroke length of the boom cylinder 10. A display control device 39 (see FIG. 4) which will be described below calculates a tilt angle θ1 of the boom 6 with respect to a Za axis of a vehicle main body coordinate system which will be described below, from the stroke length of the boom cylinder 10 detected by the first stroke sensor 16. The second stroke sensor 17 detects a stroke length of the arm cylinder 11. The display control device 39 calculates a tilt angle θ2 of the arm 7 with respect to the boom 6 from the stroke length of the arm cylinder 11 detected by the second stroke sensor 17. The third stroke sensor 18 detects the stroke length of the bucket cylinder 12. The display control device 39 calculates a tilt angle θ3 of the bucket 8 with respect to the arm 7 from the stroke length of the bucket cylinder 12 detected by the third stroke sensor 18.

The vehicle main body 1 has a work machine condition detection unit 19. The work machine condition detection unit 19 detects a current position of the excavator 100, a posture of the vehicle main body 1 and current positions of the excavation edge portions P3. The work machine condition detection unit 19 has two RTK-GNSS (Real Time Kinematic-Global Navigation Satellite Systems) antennas 21 and 22 (adequately referred to as "GNSS antennas 21 and 22" below), a three-dimensional position sensor 23, a tilt angle sensor 24, the first stroke sensor 16, the second stroke sensor 17 and the third stroke sensor 18. The GNSS antennas 21 and 22 are installed in the vehicle main body 1, more specifically, the upper swing body 3. In the present embodiment, the GNSS antennas 21 and 22 are installed spaced a certain distance apart along a Ya axis of the vehicle main body coordinate system which will be described below. The GNSS antennas 21 and 22 may be spaced a certain distance apart along a Xa axis of the vehicle main body coordinate system or may be spaced a certain distance apart in a surface of a Xa axis-Ya axis of the vehicle main body coordinate system.

Signals corresponding to GNSS radio waves received by the GNSS antennas 21 and 22 are inputted to the three-dimensional position sensor 23. The three-dimensional position sensor 23 detects positions of installation positions P1 and P2 of the GNSS antennas 21 and 22. As illustrated in FIG. 3, the tilt angle sensor 24 detects a tilt angle θ4 (adequately referred to as a "roll angle θ4" below) in a direction in which gravity applies, that is, in a width direction of the vehicle main body 1 with respect to a vertical direction Ng. In addition, in the present embodiment, the width direction means a width direction of the bucket 8, and matches with the width direction of the upper swing body 3, that is, the left and right directions. Meanwhile, when the work machine 2 has a tilt bucket which will be described below, the width direction of the bucket and the width direction of the upper swing body 3 do not match in some cases.

The excavator 100 has the operating device 25, the work machine electronic control device 26, a work machine control device 27 and an excavating machine display system (adequately referred to as a "display system" below) 28. The operating device 25 has work machine operation members 31, work machine operation detection units 32, traveling operation members 33 and traveling operation detection units 34. The work machine operation member 31 is a member which the operator uses to operate the work machine 2, and is, for example, a joystick or an operation lever. The work machine operation detection unit 32 detects content of operations of the work machine operation members 31, and sends detection signals to the work machine electronic control device 26. The traveling operation member 33 is a member which the operator uses to operate traveling of the excavator 100, and is, for example, a joystick or an operation lever. The traveling operation detection unit 34 detects content of operations of the traveling operation members 33, and sends detection signals to the work machine electronic control device 26.

The work machine electronic control device 26 has a work machine memory unit 35 which includes at least one of a RAM (Random Access Memory) and a ROM (Read Only Memory), and an operation unit 36 such as a CPU (Central Processing Unit). The work machine electronic control device 26 mainly controls the work machine 2. The work machine electronic control device 26 generates a control signal for operating the work machine 2 according to an operation of the work machine operation member 31, and outputs the control signal to the work machine control device 27. The work machine control device 27 has the proportional control valve 37, and controls the proportional control valve 37 based on the control signal from the work machine electronic control device 26. An operating oil flows out from the proportional control valve 37 at the flow rate matching the control signal from the work machine electronic control device 26, and is supplied to at least one of the boom cylinder 10, the arm cylinder 11 and the bucket cylinder 12. Then, the boom cylinder 10, the arm cylinder 11 and the bucket cylinder 12 illustrated in FIG. 1 are driven according to the operating oil supplied from the proportional control valve 37. As a result, the work machine 2 operates.

<Display System 28>

The display system 28 is a system which provides, to the operator, information for excavating a ground in a working area and forming the ground into a shape similar to a design surface which will be described below. The display system 28 includes the above first stroke sensor 16, the second stroke sensor 17 and the third stroke sensor 18, the three-dimensional position sensor 23 and the tilt angle sensor 24, and, in addition, the display input device 38 as a display device, the display control device 39 and a sound generating device 46 which includes a speaker for broadcasting a warning sound.

The display input device 38 has a touch panel input unit 41 and a display unit 42 such as an LCD (Liquid Crystal Display). The display input device 38 displays a guidance screen which provides information for excavation. Further, the guidance screen displays various keys. The operator who is an operating personnel (a service personnel in case of maintenance or repair of the excavator 100) can execute various functions of the display system 28 by touching various keys on the guidance screen. The guidance screen will be described in details below.

The display control device 39 executes various functions of the display system 28. The display control device 39 is an electronic control device which has a memory unit 43 which includes at least one of a RAM and a ROM, and a processing unit 44 such as a CPU. The memory unit 43 stores work machine data. The work machine data includes the above length L1 of the boom 6, length L2 of the arm 7 and length L3 of the bucket 8. Further, the working data includes minimum values and maximum values of the tilt angle θ1 of the boom 6, the tilt angle θ2 of the arm 7 and the tilt angle θ3 of the bucket 8.

The display control device 39 and the work machine electronic control device 26 can communicate to and from each other through a wireless or wired communication unit. The memory unit 43 of the display control device 39 stores design geography data created in advance. The design geography data is information related to the shape and the position of a three-dimensional design geography. The design geography refers to a target shape of a ground which is a working object. The display control device 39 displays the guidance screen on the display input device 38 based on the design geography data and information such as detection results from various sensors. More specifically, as illustrated in FIG. 5, the design geography is configured with a plurality of design surfaces 45 which is each represented by a triangular polygon. In addition, in FIG. 5, only one reference numeral 45 of a plurality of design surfaces is illustrated, and reference numerals of the other design surfaces are not illustrated. The target working object is one or a plurality of design surfaces of these design surfaces 45. The operator selects one or a plurality of design surfaces of these design surfaces 45 as the target surface 70. The target surface 70 is a surface to be excavated from now among a plurality of design surfaces 45. The display control device 39 has the display input device 38 display the guidance screen which notifies the position of the target surface 70 to the operator.

<Guidance Screen>

Figure 6:
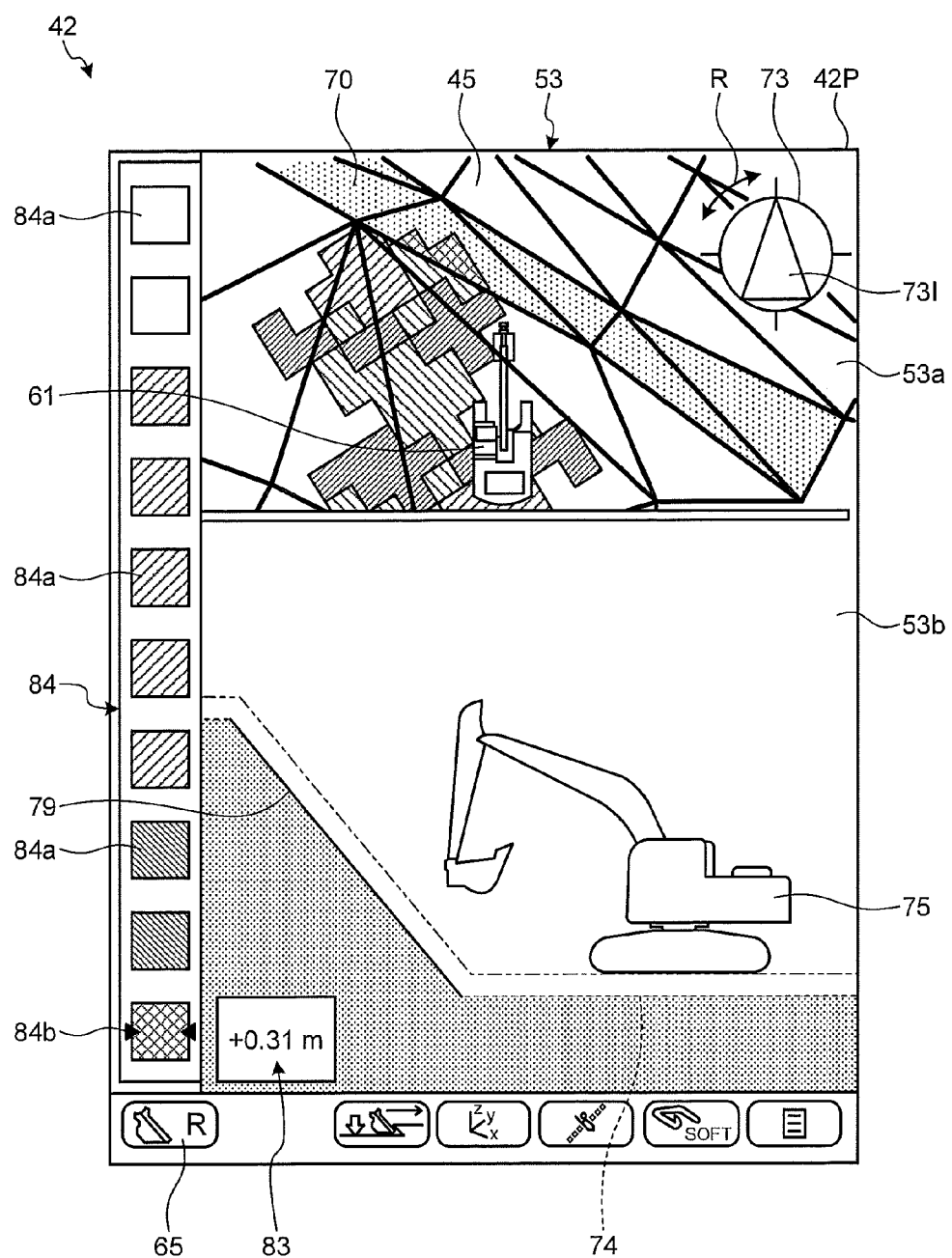
FIG. 6 is a view illustrating an example of a guidance screen.
Figure 7:
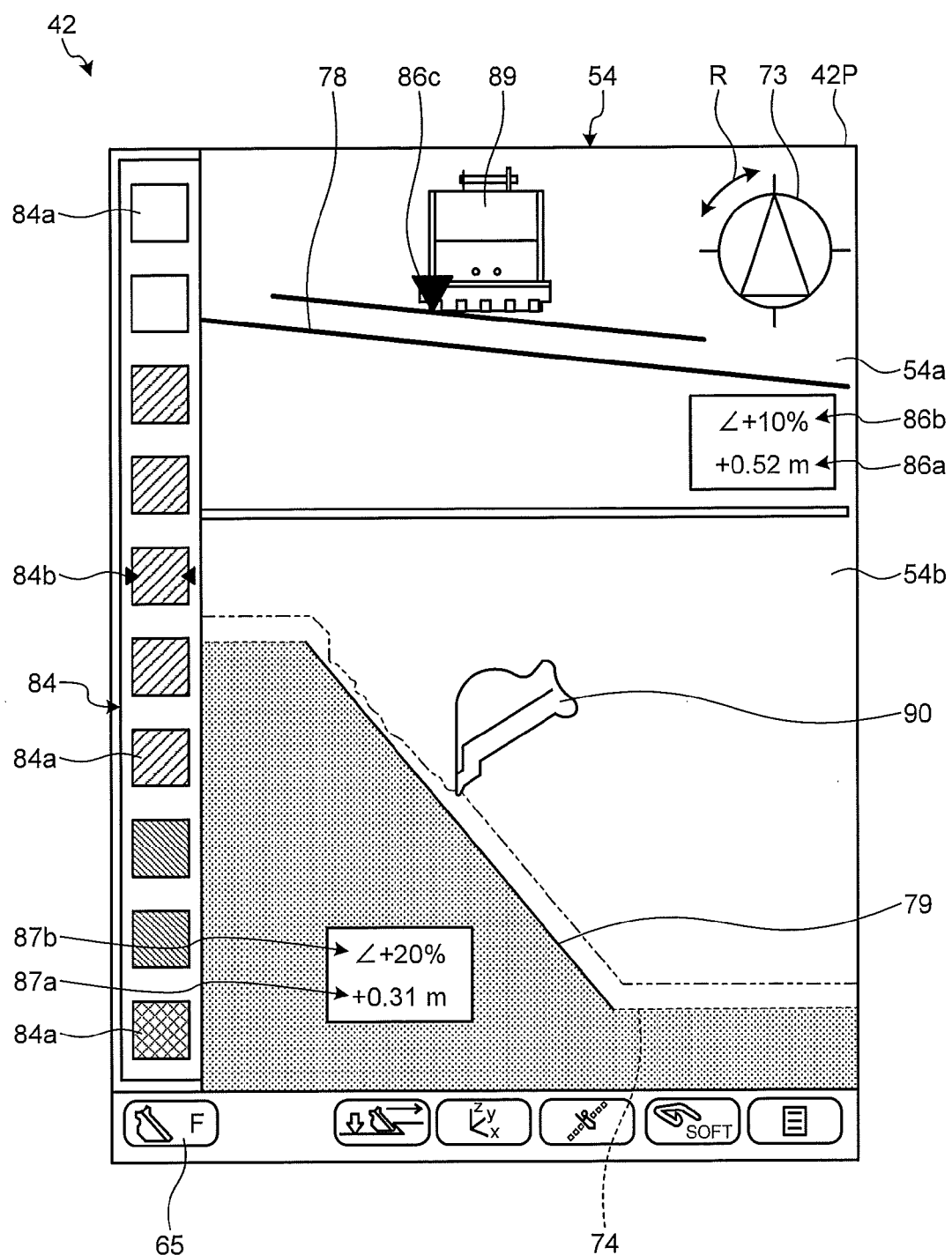
FIG. 7 is a view illustrating an example of the guidance screen.

FIGS. 6 and 7 are views illustrating examples of the guidance screen. The guidance screen is a screen which shows a positional relationship between the target surface 70 and the excavation edge portions P3 of the bucket 8, and which guides the work machine 2 of the excavator 100 to form a ground which is a working object into the same shape as the target surface 70. As illustrated in FIGS. 6 and 7, the guidance screen includes a rough excavation mode guidance screen (adequately referred to as a "rough excavation screen 53"

below) and a fine excavation mode guidance screen (adequately referred to as a "fine excavation screen 54" below).

(Rough Excavation Screen 53)

The rough excavation screen 53 illustrated in FIG. 6 is displayed on a screen 42P of the display unit 42. The rough excavation screen 53 includes a top view 53a which illustrates a design geography of a working area and a current position of the excavator 100, and a side view 53b which illustrates a positional relationship between the target surface 70 and the excavator 100. The top view 53a of the rough excavation screen 53 represents a design geography by a plurality of triangular polygons viewed from the top view. More specifically, the top view 53a represents a design geography which illustrates as a projection surface a rotation surface which is a surface on which the excavator 100 rotates. Hence, the top view 53a is a bird view illustrating the excavator 100 from above, and when the excavator 100 tilts, the design surface also tilts.

Further, the target surface 70 which is selected as a target working object from a plurality of design surfaces 45 is displayed by a color different from those of the other design surfaces 45. In addition, although, in FIG. 6, the current position of the excavator 100 is indicated by an icon 61 of the excavator viewed from the top view, the current position may be indicated by other symbols. Further, the top view 53a includes information which makes the excavator 100 face with the target surface 70. The information which makes the excavator 100 face with the target surface 70 is displayed as a target surface facing compass 73. The target surface facing compass 73 is, for example, an icon an arrow-shaped pointer 73I which rotates in an arrow R direction, and which indicates a direction facing with the target surface 70 and a direction in which the excavator 100 needs to be rotated. The operator of the excavator 100 can check the degree of facing with respect to the target surface 70 from the target surface facing compass 73.

The side view 53b of the rough excavation screen 53 includes an image which indicates a positional relationship between the target surface 70 and the excavation edge portions P3 of the bucket 8, and distance information which indicates a distance between the target surface 70 and the excavation edge portions P3 of the bucket 8. More specifically, the side view 53b includes a line 74 which indicates a cross section of the design surface, a line 79 which indicates a cross section of the target surface and an icon 75 of the excavator 100 viewed from the side. The line 74 which indicates the cross section of the design surface indicates a cross section of the design surface 45 other than the target surface 70. The line 79 which indicates the cross section of the target surface indicates the cross section of the target surface 70. As illustrated in FIG. 5, the line 74 which indicates the cross section of the design surface and the line 79 which indicates the cross section of the target surface are calculated by calculating an intersection line 80 of a surface 77 which passes on the current positions of the excavation edge portions P3 of the bucket 8 and the design surface 45. The intersection line 80 is calculated by the processing unit 44 of the display control device 39. A method of calculating current positions of the excavation edge portions P3 of the bucket 8 will be described below.

In the side view 53b, the line 79 which indicates the cross section of the target surface is displayed by a color different from that of the line 74 which indicates the cross section of the design surface. In addition, the line 79 which indicates the cross section of the target surface and the line 74 which indicates the cross section of the design surface are represented by changing line types in FIG. 6. Further, in the side view 53b, an area closer to an underground side than the line 79 which indicates the cross section of the target surface and the line 74 which indicates the design surface, and an area closer to an aerial side than these lines are indicated by different colors. In FIG. 6, the difference in color is represented by applying a hatching to the area closer to the underground side than the line 79 which indicates the cross section of the target surface and the line 74 which indicates the cross section of the design surface.

The distance information which indicates the distance between the target surface 70 and the excavation edge portions P3 of the bucket 8 includes numerical value information 83 and graphic information 84. The numerical value information 83 is a numerical value indicating the shortest distance between the excavation edge portions P3 of the bucket 8 and the target surface 70. The graphic information 84 is information which indicates a distance between the excavation edge portions P3 of the bucket 8 and the target surface 70 as graphics. The graphic information 84 is a guidance indicator which indicates the positions of the excavation edge portions P3 of the bucket 8. More specifically, the graphic information 84 includes index bars 84a, and index marks 84b of the index bars 84a which indicate a position at which the distance between the excavation edge portions P3 of the bucket 8 and the target surface 70 corresponds to zero. Each index bar 84a is lighted according to the shortest distance between the front end of the bucket 8 and the target surface 70. In addition, on/off of display of the graphic information 84 can be switched by an operation by the operator of the excavator 100.

As described above, the rough excavation screen 53 displays a relative positional relationship between the line 79 which indicates the cross section of the target surface and the excavator 100, and a numerical value which indicates the shortest distance between the excavation edge portions P3 of the bucket 8 and the line 79 which indicates the cross section of the target surface. The operator of the excavator 100 can easily excavate a ground such that the current geography is formed into a design geography by moving the excavation edge portions P3 of the bucket 8 along the line 79 which indicates the cross section of the target surface. In addition, the rough excavation screen 53 displays a screen switch key 65 which switches the guidance screen. The operator can switch the rough excavation screen 53 to the fine excavation screen 54 by operating the screen switch key 65.

(Fine Excavation Screen 54)

The fine excavation screen 54 illustrated in FIG. 7 is displayed on the screen 42P of the display unit 42. The fine excavation screen 54 illustrates the positional relationship between the target surface 70 and the excavator 100 in more detail than the rough excavation screen 53. That is, the fine excavation screen 54 illustrates the positional relationship between the target surface 70 and the excavation edge portions P3 of the bucket 8 in more detail than the rough excavation screen 53. The fine excavation screen 54 includes a front view 54a which shows the target surface 70 and the bucket 8, and a side view 54b which shows the target surface 70 and the bucket 8. The front view 54a of the fine excavation screen 54 includes an icon 89 which indicates the bucket 8 viewed from the front view, and a line 78 which indicates a cross section of the target surface 70 viewed from the front. The front side (front view) is a view of the bucket 8 illustrated in FIGS. 1 and 2 from a vehicle main body side 1, and is to be viewed in parallel to a Ya axis of a vehicle main body coordinate system which will be described below.

The side view 54b of the fine excavation screen 54 includes an icon 90 of the bucket 8 viewed from a side, the line 74 which indicates the cross section of the design surface and the line 79 which indicates the cross section of the target surface. Further, the front views 54a and the side view 54b of the fine excavation screen 54 each display information indicating the positional relationship between the target surface 70 and the bucket 8. A lateral side (side view) is a view from a direction in which the bucket pin 15 illustrated in FIGS. 1 and 2 extends (a turn center axis direction of the bucket 8), and is to be viewed in parallel to a Xa axis of the vehicle main body coordinate system which will be described below.

The information indicating the positional relationship between the target surface 70 and the bucket 8 in the front view 54a includes distance information 86a and angle information 86b. The distance information 86a indicates a distance between the excavation edge portions P3 of the bucket 8 and the target surface 70 in the Za direction. This distance is a distance between a closest position of the positions of the excavation edge portions P3 of the bucket 8 in the width direction with respect to the target surface 70, and the target surface 70. In the front view 54a, a mark 86c which indicates the closest position is overlaid on the icon 89 in the front view of the bucket 8 and displayed. The angle information 86b is information indicating an angle between the target surface 70 and the bucket 8. More specifically, the angle information 86b is an angle between a virtual line segment which passes on the excavation edge portions P3 of the bucket 8 and the line 78 which indicates the target surface.

In the side view 54b, information indicating the positional relationship between the target surface 70 and the bucket 8 includes distance information 87a and angle information 87b. The distance information 87a indicates the shortest distance between the excavation edge portions P3 of the bucket 8 and the target surface 70, that is, the distance between the front end of the bucket 8 in a direction vertical to the target surface 70 and the target surface 70. Further, the angle information 87b is information which indicates an angle between the target surface 70 and the bucket 8. More specifically, the angle information 87b displayed in the side view 54b is an angle between a bottom surface of the bucket 8 and the line 79 which indicates the cross section of the target surface.

The fine excavation screen 54 includes the graphic information 84 which indicates the above distance between the excavation edge portions P3 of the bucket 8 and the target surface 70 as graphics. The graphic information 84 includes the index bars 84a and the index marks 84b similar to the graphic information 84 of the rough excavation screen 53. As described above, the fine excavation screen 54 displays a relative positional relationship between the lines 78 and 79 which indicate the cross sections of the target surface and the excavation edge portions P3 of the bucket 8 in detail. The operator of the excavator 100 can more easily excavate a ground such that the current geography is formed into the same shape as a three-dimensional design geography by moving the excavation edge portions P3 of the bucket 8 along the lines 78 and 79 which indicate the cross sections of the target surface. In addition, the fine excavation screen 54 displays the screen switch key 65 similar to the above rough excavation screen 53. The operator can switch the fine excavation screen 54 to the rough excavation screen 53 by operating the screen switch key 65.

<Method of Calculating Current Positions of Excavation Edge Portions P3 of Bucket 8>

The line 79 which indicates the cross section of the target surface is calculated from current positions of the excavation edge portions P3 of the bucket 8. The display control device 39 calculates the current positions of the excavation edge portions P3 of the bucket 8 in the global coordinate system $\{X,Y,Z\}$ based on detection results of, for example, the three-dimensional position sensor 23, the first stroke sensor 16, the second stroke sensor 17, the third stroke sensor 18 and the tilt angle sensor 24. In the present embodiment, the current positions of the excavation edge portions P3 of the bucket 8 are calculated as follows.

Figure 8:
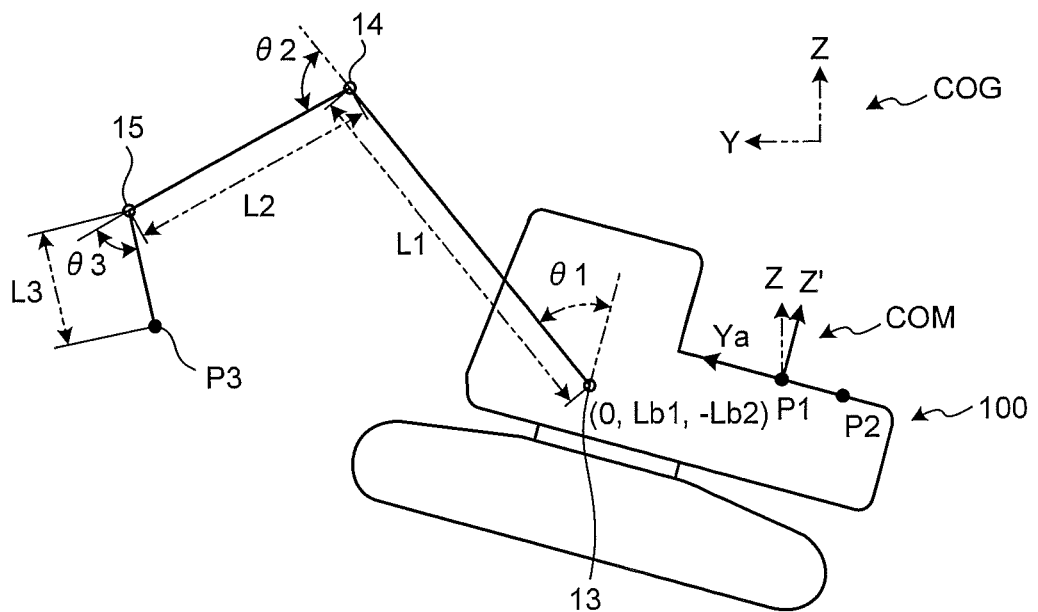
FIG. 8 is a view for describing an example of a method of calculating current positions of excavation edge portions P3.
Figure 9:
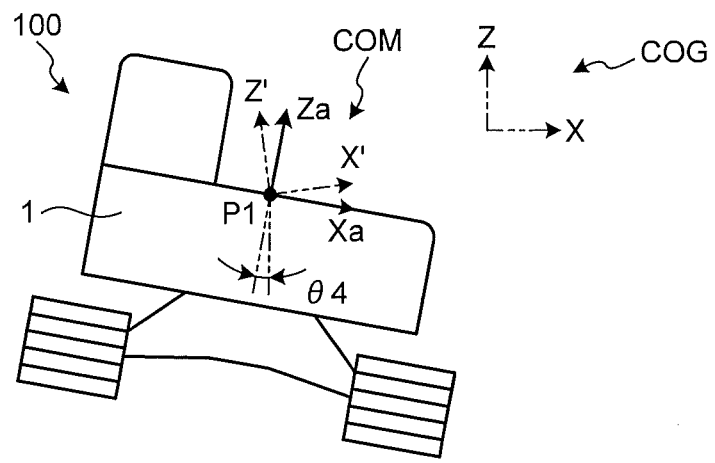
FIG. 9 is a view for describing an example of a method of calculating current positions of the excavation edge portions P3.

FIGS. 8 and 9 are views for describing examples of the method of calculating current positions of the excavation edge portions P3. FIG. 8 is a side view of the excavator 100, and FIG. 9 is a rear view of the excavator 100. To calculate the current positions of the excavation edge portions P3 of the bucket 8, the display control device 39 calculates a vehicle main body coordinate system $\{Xa,Ya,Za\}$ the origin of which is the installation position P1 of the above GNSS antenna 21 as illustrated in FIG. 8. In this example, front and rear directions of the excavator 100, that is, a Ya axis direction of a coordinate system (vehicle main body coordinate system) COM of the vehicle main body 1, is tilted with respect to the Y axis direction of a global coordinate system COG. Further, the coordinate of the boom pin 13 in the vehicle main body coordinate system COM is (0, Lb1, −Lb2), and is stored in the memory unit 43 of the display control device 39 in advance. In the vehicle main body coordinate system COM, the upper swing body 3 of the excavator 100 rotates on the surface parallel to a Xa-Ya surface. In the vehicle main body coordinate system COM, the work machine 2 of the excavator 100 is driven by the boom cylinder 10, the arm cylinder 11 and the bucket cylinder 12, and the boom 6, the arm 7 and the bucket 8 move along the Ya-Za surface. When the boom cylinder 10, the arm cylinder 11 and the bucket cylinder 12 are driven, the arm 7 moves along the Ya-Za surface and the bucket 8 moves in the vehicle main body coordinate system COM which is fixed according to the posture (tilt) of the vehicle main body 1.

The three-dimensional position sensor 23 illustrated in FIG. 4 detects the installation positions P1 and P2 of the GNSS antennas 21 and 22 illustrated in FIG. 2. A unit vector in the Ya axis direction is calculated according to Formula (1) from the coordinate positions of the detected installation positions P1 and P2.

$$Ya=(P1-P2)/|P1-P2| \quad (1)$$

As illustrated in FIG. 8, when a vector Z' which passes on the surface represented by two vectors Ya and Z and is vertical to Ya is introduced, relationships of Formula (2) and Formula (3) hold. c in Formula (3) is a constant. Z' is expressed as in Formula (4) according to Formula (2) and Formula (3). Further, when a vector which is vertical to Ya and Z' is X', X' is as expressed in Formula (5).

$$(Z',Ya)=0 \quad (2)$$

$$Z'=(1-c)\times Z+c\times Ya \quad (3)$$

$$Z'=Z+\{(Z,Ya)/((Z,Ya)-1)\}\times (Ya-Z) \quad (4)$$

$$X'=Ya\perp Z' \quad (5)$$

As illustrated in FIG. 9, the vehicle main body coordinate system COM is rotated only the roll angle θ4 about the Ya axis, and then is expressed as in Formula (6).

$$[Xa \ Ya \ Za] = [X' \ Ya \ Z'] \begin{bmatrix} \cos\theta 4 & 0 & \sin\theta 4 \\ 0 & 1 & 0 \\ -\sin\theta 4 & 0 & \cos\theta 4 \end{bmatrix} \quad (6)$$

Further, the current tilt angles θ1, θ2 and θ3 of the above boom 6, arm 7 and bucket 8 are calculated from detection results of the first stroke sensor 16, the second stroke sensor 17 and the third stroke sensor 18. The coordinates (xat, yat, zat) of the excavation edge portions P3 of the bucket 8 in the vehicle main body coordinate system COM can be calculated according to Formula (7), Formula (8) and Formula (9) using the tilt angles θ1, θ2 and θ3 and the lengths L1, L2 and L3 of the boom 6, the arm 7 and the bucket 8. The excavation edge portions P3 of the bucket 8 move in the Ya-Za surface of the vehicle main body coordinate system COM. The coordinate of the excavation edge portions P3 of the bucket 8 in the global coordinate system COG can be calculated according to Formula (10). The coordinates of the excavation edge portions P3 in the global coordinate system COG are positions of the excavation edge portions P3.

$$xat=0 \quad (7)$$

$$yat=Lb1+L1 \times \sin\theta1+L2 \times \sin(\theta1+\theta2)+L3 \times \sin(\theta1+\theta2+\theta3) \quad (8)$$

$$zat=-Lb2+L1 \times \cos\theta1+L2 \times \cos(\theta1+\theta2)+L3 \times \cos(\theta1+\theta2+\theta3) \quad (9)$$

$$P3=xat \cdot Xa+yat \cdot Ya+zat \cdot Za+P1 \quad (10)$$

The display control device 39 calculates the intersection line 80 of a three-dimensional geometry and a Ya-Za surface 77 which passes on the excavation edge portions P3 of the bucket 8 as illustrated in FIG. 5 based on the current positions of the excavation edge portions P3 of the bucket 8 calculated above and the design geography data stored in the memory unit 43. Further, the display control device 39 displays a portion of this intersection line 80 which passes on the target surface 70, on the guidance screen as the above line 79 which indicates the cross section of the target surface. Next, an example will be described where the display control device 39 illustrated in FIG. 4 displays the current positions of the excavation edge portions P3 when the bucket 8 excavates a ground of a working object, from the top view on the screen 42P of the display unit 42 of the display input device 38.

<Top View Display of Excavation Edge Portions P3 of Bucket 8>

Figure 10:
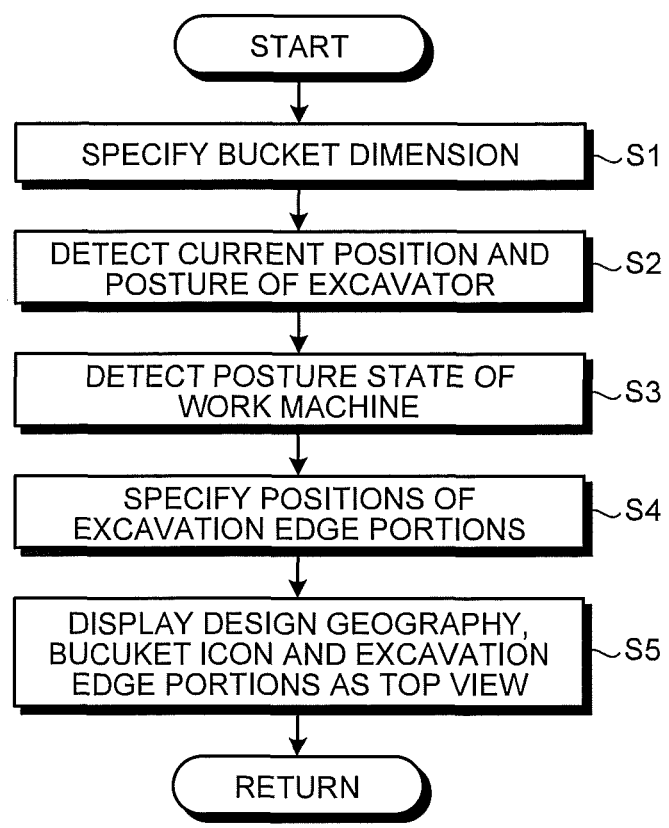
FIG. 10 is a flowchart illustrating process of displaying the excavation edge portions P3 from a top view.

FIG. 10 is a flowchart illustrating process of displaying the excavation edge portions P3 from the top view. To display the excavation edge portions P3 on the screen 42P of the display unit 42 illustrated in FIG. 4, the display control device 39, more specifically, the processing unit 44 specifies a bucket dimension in step S1. The bucket 8 is detachable from the arm 7, and the bucket 8 can be reattached to the arm 7 and attached to the work machine 2. In the memory unit 43 of the display control device 39 illustrated in FIG. 4, bucket outer shape information which is inputted from the input unit 41 and which is used to specify the dimension of the bucket 8 is stored.

Next, in step S2, the processing unit 44 detects the current position of the excavator 100. The display control device 39 detects the current position of the vehicle main body 1 and the posture of the vehicle main body 1 based on a detection signal from the three-dimensional position sensor 23.

As described above, in the vehicle main body coordinate system COM, the boom 6, the arm 7 and the bucket 8 of the work machine 2 of the excavator 100 are driven by the boom cylinder 10, the arm cylinder 11 and the bucket cylinder 12 along the Ya-Za surface. When the boom cylinder 10, the arm cylinder 11 and the bucket cylinder 12 are driven, the arm 7 moves along the Ya-Za surface and the bucket 8 moves in the vehicle main body coordinate system COM which is fixed according to the posture (tilt) of the vehicle main body 1. The, the processing unit 44 detects a posture state of the work machine 2 based on detection results of, for example, the three-dimensional position sensor 23, the first stroke sensor 16, the second stroke sensor 17, the third stroke sensor 18 and the tilt angle sensor 24 (step S3).

Next, in step S4, the processing unit 44 specifies the positions of the excavation edge portions P3 of the bucket 8. More specifically, the coordinates (xat, yat, zat) of the excavation edge portions P3 of the bucket 8 in the vehicle main body coordinate system COM can be calculated according to Formula (7), Formula (8) and Formula (9) using the tilt angles θ1, θ2 and θ3 and the lengths L1, L2 and L3 of the boom 6, the arm 7 and the bucket 8.

Next, in step S5, the processing unit 44 displays an image which represents a design geography (a target shape of a working object), an icon of the bucket 8 and the positions of the excavation edge portions P3, as the top view on the screen 42P of the display unit 42.

Figure 11:
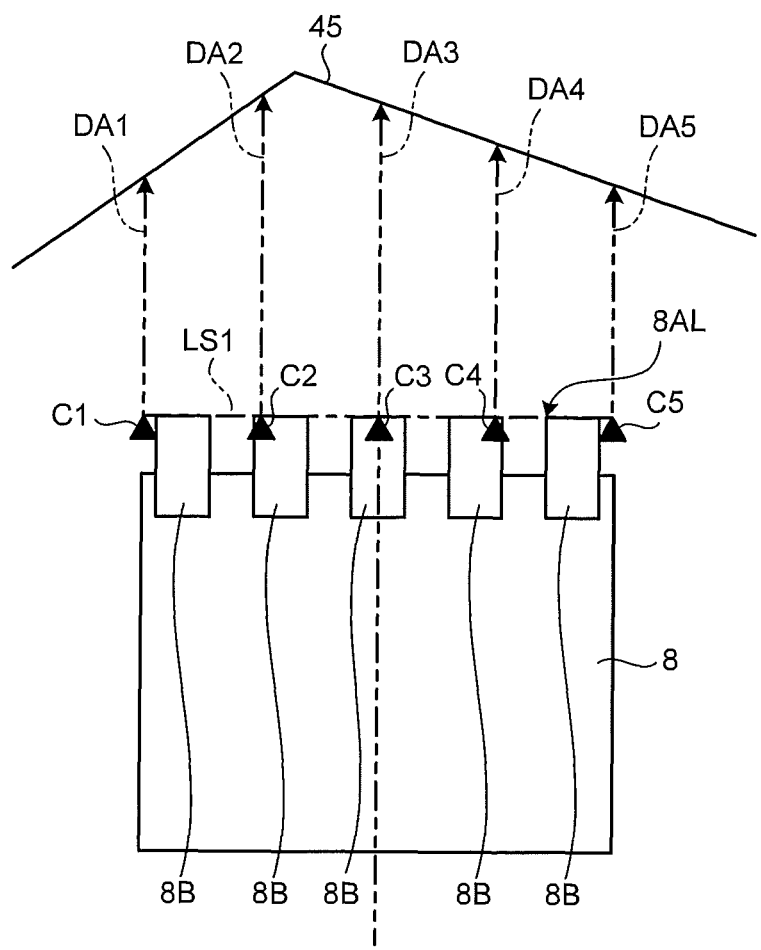
FIG. 11 is an explanatory view describing a display example of the excavation edge portions P3.

The processing unit 44 can intelligibly display the shortest distance between the design geography (the target shape of the working object) and the excavation edge portions P3 of the bucket 8 on the screen 42P of the display unit 42 by setting a plurality of calculation points on the excavation edge portions P3 of the bucket 8 and calculating the distance between each calculation point and the target surface. FIG. 11 is an explanatory view describing a display example of the excavation edge portions P3. As illustrated in FIG. 11, the bucket 8 calculates a virtual line segment LS1 which passes on front ends of a plurality of blades 8B and matches with the width direction dimension of the bucket 8. In addition, the processing unit 44 reads the width direction dimension of the bucket 8 from the bucket outer shape information specified in step S1, and calculates the virtual line segment LS1. This virtual line segment LS1 is a line segment 8AL which is an example of the image which will be described below and which indicates the positions of the excavation edge portions P3.

Next, the processing unit 44 equally divides the virtual line segment LS1 into a plurality of (for example, four) ranges, and sets five points which indicate the boundaries and both ends of respective ranges as a first calculation point C1, a second calculation point C2, a third calculation point C3, a fourth calculation point C4 and a fifth calculation point C5. The number of divisions i is a natural number, and i is 1, 2, 3, 4 and 5 in the present embodiment. That is, the first calculation point C1, the second calculation point C2, the third calculation point C3, the fourth calculation point C4 and the fifth calculation point C5 indicate a plurality of specific positions in the width direction of the excavation edge portions P3 of the bucket 8. Further, the processing unit 44 calculates current positions of the first calculation point C1, the second calculation point C2, the third calculation point C3, the fourth calculation point C4 and the fifth calculation point C5 based on the current position of the excavator 100 detected in step S2. More specifically, the processing unit 44 calculates the current position of the third calculation point C3 in the center according to the above method of calculating the current positions of the excavation edge portions P3 of the bucket 8. Further, the processing unit 44 calculates the current position of the third calculation point C3 in the center, and calculates the other current positions of the first calculation point C1, the second calculation point C2, the fourth calculation point C4 and the fifth calculation point C5 from the width direction dimension of the bucket 8 and the direction in which the virtual line segment LS1 extends.

Figure 12:
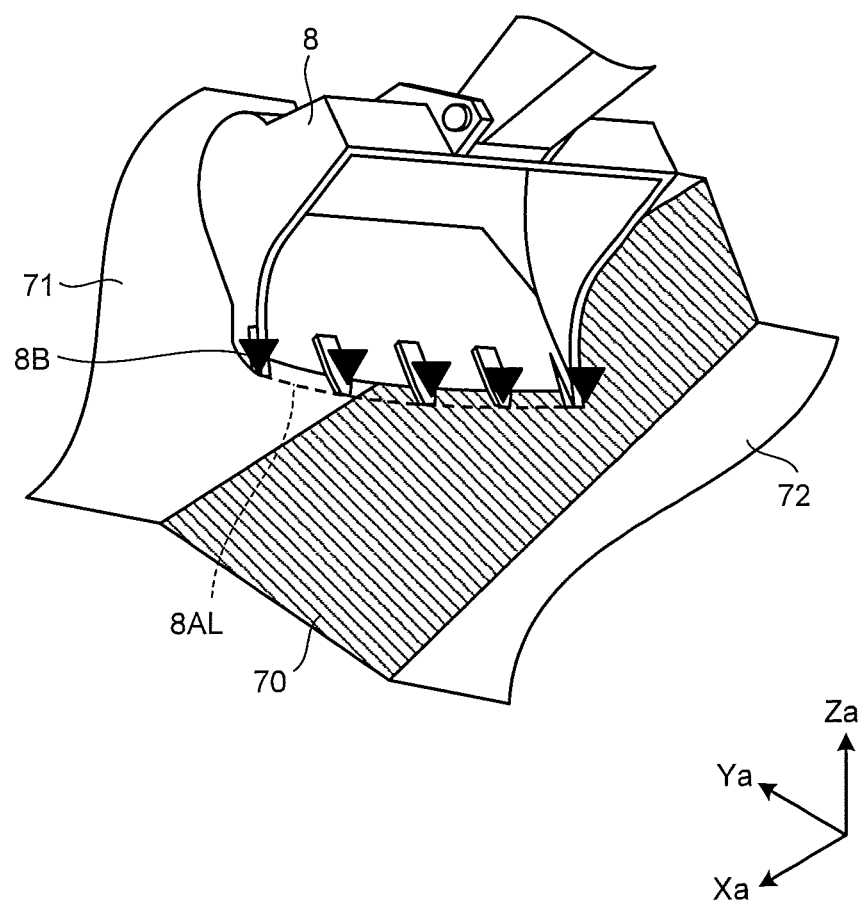
FIG. 12 is a perspective view for describing rotation of the excavation edge portions P3.
Figure 13:
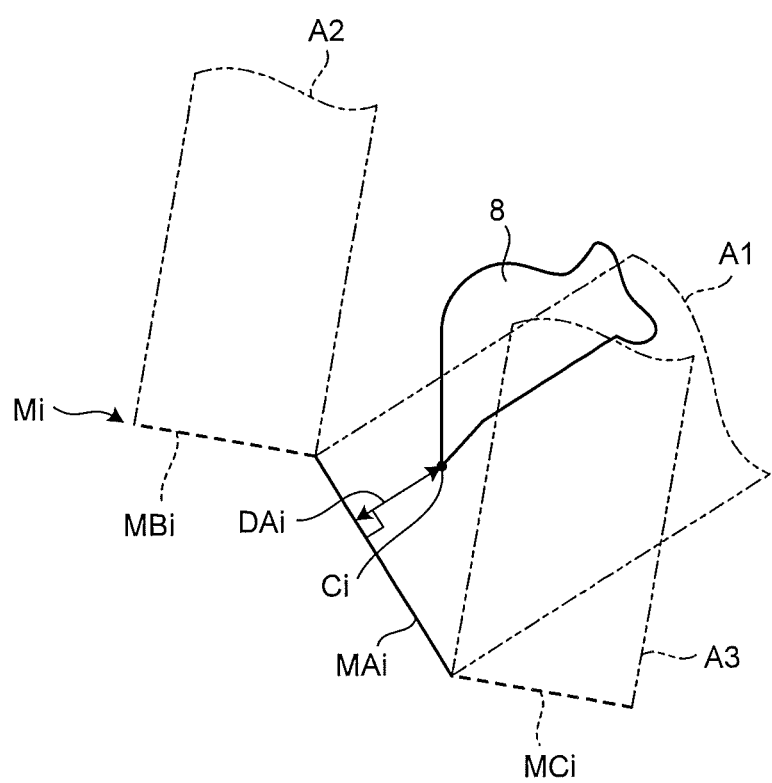
FIG. 13 is a side view for describing a target surface distance DAi.

FIG. 12 is a perspective view for describing rotation of the excavation edge portions P3. FIG. 13 is a side view for describing a target surface distance DAi. As described above, the bucket 8 is swingably attached to the front end portion of the arm 7 by means of the bucket pin 15. The bucket 8 may rotate about the bucket pin 15 of the bucket 8 from an uppermost end 71 (the top of the slope) of the normal surface of the target surface 70 toward the lowermost end 72 (the foot of the slope) of the target surface such that the front ends of the blades 8B draw arcs. By this means, the line segment 8AL which indicates the positions of the excavation edge portions P3 also rotates drawing an arc. Further, the above length L3 of the bucket 8 is the radius of the arc of this rotation.

When an intersection line of the Ya-Za surface which passes on an i-th calculation point Ci and the design surface 45 is Mi, the processing unit 44 calculates the distance between each straight line MAi-MCi included in the intersection line Mi and the i-th calculation point Ci in step S4. Meanwhile, a vertical line which passes on the i-th calculation point Ci is calculated for each straight line MAi-MCi included in the intersection line Mi, thus the distance between each straight line MAi-MCi and the i-th calculation point Ci is calculated. When, for example, the i-th calculation point Ci is positioned in a target area A1 of target areas A1, A2, and A3 as illustrated in FIG. 13, a vertical line of a target line MAi which passes on the first calculation point Ci is calculated, and the shortest distance (referred to as a "target surface distance DAi" below) between the i-th calculation point Ci and the target line MAi is calculated. Thus, the processing unit 44 calculates distances DA1 to DA5 illustrated in FIG. 11, and sets the shortest distance as the target surface distance DA1. This target surface distance DA1 is displayed as the above numerical value information 83 illustrated in FIG. 6.

Figure 14:
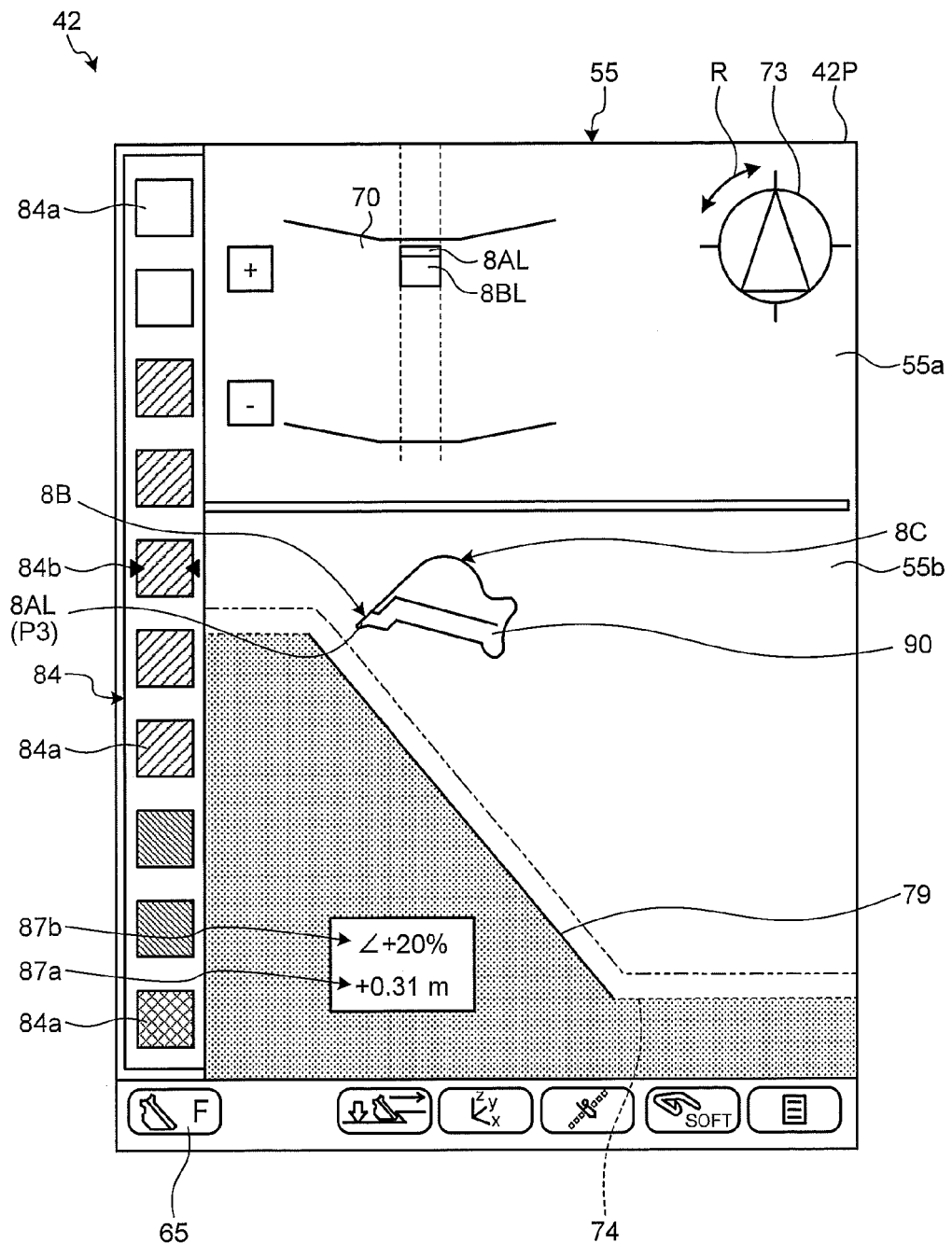
FIG. 14 is a view illustrating an example where the excavation edge portions P3 are displayed from the top view is displayed on a screen P42 of a display unit 42.
Figure 15:
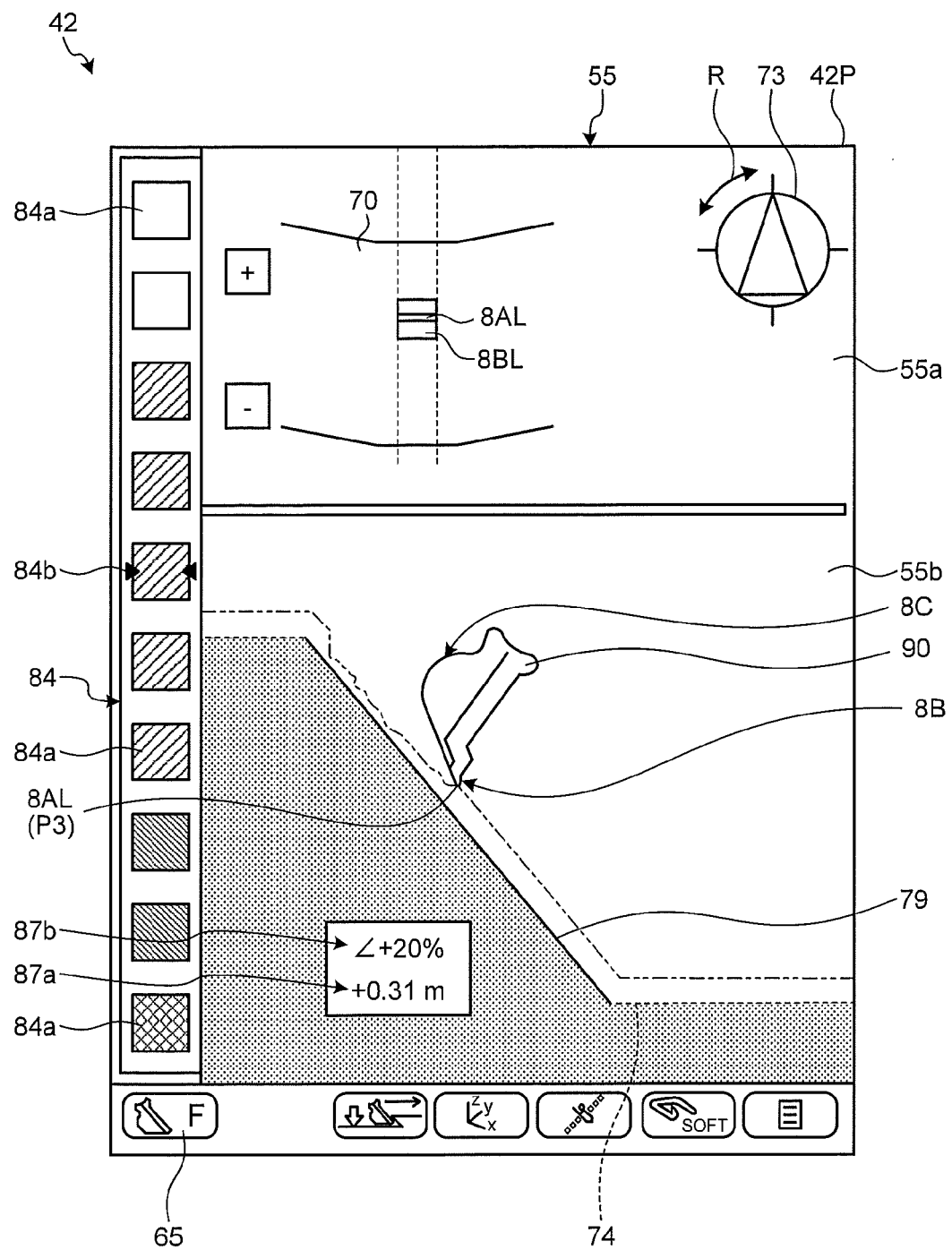
FIG. 15 is a view illustrating an example where the excavation edge portions P3 are displayed from the top view on the screen 42P of the display unit 42.

The processing unit 44 displays an icon display (image) 8BL of the bucket 8 from the top view based on the bucket outer shape information which is stored in the memory unit 43 and which specifies the dimension of the bucket 8. A top side (top view) is to view the bucket 8 illustrated in FIGS. 1 and 2 from above in a direction parallel to the Za axis of the above vehicle main body coordinate system. The processing unit 44 reads information about dimensions of the bucket width, the bucket length and the bucket height of the bucket 8 from the bucket outer shape information specified in step S1, and obtains an image of the icon display 8BL of the bucket 8 viewed from the top view based on the information about the outer shape of the bucket 8 projected in the direction parallel to the Za axis of the vehicle main body coordinate system. The processing unit 44 displays the image which indicates the positions of the excavation edge portions P3 on the display unit 42P which indicates the positions of the excavation edge portions P3 such that relative positions of the excavation edge portions are intelligible with respect to the icon display 8BL of the bucket 8 viewed from the top. FIGS. 14 and 15 are views illustrating an example where the excavation edge portions P3 are displayed from the top view on the screen 42P of the display unit 42.

A fine excavation screen 55 illustrated in FIGS. 14 and 15 includes a top view 55a which shows a design geography (a target shape of a working object) and the bucket 8, and a side view 55b which shows the line 79 which indicates the cross section of the target surface and the bucket 8. The top view 55a of the fine excavation screen 55 includes the target surface 70 viewed from the top.

The side view 55b of the fine excavation screen 55 includes the icon 90 of the bucket 8 viewed from the side, the line 74 which indicates the cross section of the design surface and the line 79 which indicates the cross section of the target surface. Further, the top views 55a and the side view 55b of the fine excavation screen 54 each display information indicating the positional relationship between the target surface 70 and the bucket 8. A side view is a view from a direction in which the bucket pin 15 illustrated in FIGS. 1 and 2 extends (a turn center axis direction of the bucket 8). The display control device 39 according to the present embodiment simultaneously displays the side view 55b and the top view 55a to intelligibly provide positions of excavation edge portions which follow rotation of the bucket 8, to the operator when the operator proceeds with construction work according to the design surface. The display control device 39 may set the side view 55b to non-display, and displays the top view 55a. The side view 55b displays the icon 90 of the bucket 8 viewed from the side.

The bucket 8 illustrated in FIG. 14 raises the excavation edge portions P3 upward to proceed with construction work on the uppermost end (the top of the slope) of the normal surface of the target surface. In this case, in the top view 55a, the line segment 8AL which indicates the positions of the excavation edge portions P3 is displayed on the screen 42 of the display unit 42 even when this line segment is simultaneously displayed together with the icon display 8BL of the bucket 8.

The bucket 8 illustrated in FIG. 15 rotates the excavation edge portions P3 of the bucket 8 from the upside to the downside to proceed with construction work from the uppermost end (the top of the slope) of the normal surface of the target surface to the lowermost end (the foot of the slope) of the target surface. In this case, in the top view 55a, the line segment 8AL which indicates the positions of the excavation edge portions P3 comes to a position which cannot be originally seen behind the icon display 8BL of the bucket 8. Hence, when viewed from above in the direction parallel to the Za axis of the vehicle main body coordinate system (when viewed from the topside), the processing unit 44 displays the icon display 8BL of the bucket 8, and displays the line segment 8AL which is the image which indicates the positions of the excavation edge portions P3, at all on the display unit 42P such that relative positions of the excavation edge portions P3 are intelligible with respect to the icon display 8BL of the bucket 8. Hence, the operator can recognize the positions of the excavation edge portions P3 even when the excavation edge portions P3 are inside the icon display 8BL of the bucket 8.

To display the image which shows the positions of the excavation edge portions P3 on the display unit 42P at all times, the processing unit 44 calculates relative positions of the excavation edge portions P3 with respect to the icon display 8BL of the bucket 8 viewed from the top, and commands the display unit 42 to display a display layer of the image which indicates the positions of the excavation edge portions P3 over a display layer of the icon display 8BL of the bucket 8. By this means, the line segment 8AL which is the image which indicates the excavation edge portions P3 is displayed at all times without hiding behind the icon display 8BL of the bucket 8.

Alternatively, to display the image which indicates the positions of the excavation edge portions P3 on the display unit 42P at all times, the processing unit 44 may perform transparency processing of at least part of the icon display 8BL of the bucket 8 which overlaps the image which indicates the positions of the excavation edge portions P3. Meanwhile, the transparency processing refers to erasing display of part of the bucket 8 of which excavation edge portions P3 overlap, or displaying the part of the bucket 8 transparently. By this means, the line segment 8AL which is the image which shows the excavation edge portions P3 is displayed at all times without hiding behind the icon display 8BL of the bucket 8.

As described above, the processing unit 44 displays the line segment 8AL which indicates the positions of the excavation edge portions P3 preferentially over the icon display 8BL of the displayed bucket 8, from the top view on the screen 55a. Consequently, even when the excavation edge portions P3 come to positions at which the excavation edge portions P3 cannot be originally viewed from the top due to the outer shape of the bucket 8, the operator can learn the positions of the excavation edge portions P3 from the image (line segment 8AL) which indicates the positions of the excavation edge portions P3 as illustrated in the top view 55a of the FIG. 15. As a result, the excavating machine display system 28 can intelligibly provide positions of excavation edge portions P3 which follow rotation of the bucket 8, to an operator when the operator proceeds with construction work according to the design surface.

Further, the processing unit 44 displays the line segment 8AL which indicates the positions of the excavation edge portions P3 preferentially over the icon display 8BL of the displayed bucket 8, from the top view on the screen 55a, and simultaneously displays the target surface 70. Although the position of the bucket 8 with respect to the target surface 70 changes when the bucket 8 moves, as is clear upon comparison between FIGS. 14 and 15, the line segment 8AL which is the target surface 70, the icon display 8BL of the bucket 8 and an image which indicates the positions of the excavation edge portions P3 are simultaneously displayed, so that the operator can more intuitively learn the relative position of the bucket 8 with respect to the target surface 70 and the relative positions of the excavation edge portions P3 with respect to the target surface 70.

In addition, the processing unit 44 displays the line segment 8AL which is the image which indicates the positions of the excavation edge portions P3, in a mode different from the mode of the icon display 8BL of the bucket 8. As an example of a different mode, the processing unit 44 may display the icon display 8BL in a color different from a color for displaying the icon display 8BL of the bucket 8, and highlights the line segment 8AL by making the line segment 8AL distinct from the surrounding. Further, the processing unit 44 may highlight the line segment 8AL by making the line segment 8AL distinct from the surrounding as the line segment 8AL which is displayed by a wider line width than a line width for displaying the icon display 8BL of the bucket 8. Alternatively, the processing unit 44 may highlight the line segment 8AL by making the line segment 8AL distinct from the surrounding as the line segment 8AL which is displayed at higher brightness than brightness for displaying the icon display 8BL of the bucket 8. In the present embodiment, although the line segment 8AL which is an image which indicates the positions of the excavation edge portions P3 is indicated by a solid line, the line segment 8AL is not limited to this. For example, the line segment 8AL may be a virtual line such as a solid line, a broken line, a chain line or a double-chain line.

Although the processing unit 44 uses the line segment 8AL as the image which indicates the positions of the excavation edge portions P3, the line segment 8AL is not limited to this, and, for example, triangular symbols or arrows which indicate the above first calculation point C1, second calculation point C2, third calculation point C3, fourth calculation point C4 and fifth calculation point C5 may be used. Thus, in an image which indicates positions of the excavation edge portions P3, picture patterns such as dots, characters or lines may continue or be dotted, and symbols which enable identification of the positions of the excavation edge portions P3 at a first glance are included.

As described above, the excavating machine display system 28 is a system which operates the work machine 2 which includes the bucket 8 which generates an excavation force at the excavation edge portions P3, and the vehicle main body 1 to which this work machine 2 is attached. The excavating machine display system 28 includes the work machine condition detection unit 19, the memory unit 43 and the processing unit 44. The work machine condition detection unit 19 detects a current position of the excavator 100, a posture of the vehicle main body 1 and current positions of the excavation edge portions P3. The memory unit 43 stores position information about the target surface which indicates a target shape of a working object, and outer shape information about the bucket 8.

The processing unit 44 calculates the icon display 8BL of the bucket 8 and positions of the excavation edge portions P3 viewed from the top side of the excavator 100 based on information related to a current position of the excavator 100, the posture of the vehicle main body 1, current positions of the excavation edge portions P3 and the outer shape information about the bucket 8, and displays the target surface 70, the icon display 8BL of the bucket 8 and an image which indicates the positions of the excavation edge portions P3, on the screen 42P of the display unit 42. Meanwhile, the image which indicates the positions of the excavation edge portions P3 is indicated by the line segment 8AL. By so doing, even when the excavation edge portions P3 come to positions at which the excavation edge portions P3 cannot be originally viewed from the top due to the outer shape of the bucket 8 and are hidden, the operator of the excavator 100 can learn the positions of the excavation edge portions P3 from the image which indicates the positions of the excavation edge portions P3 such as the line segment 8AL and check a state where the excavation edge portions P3 of the bucket 8 are moving, on the screen 42P of the display unit 42. As a result, the operator can proceed with construction work while checking the positions of the excavation edge portions P3 by visually checking the image which indicates the positions of the excavation edge portions P3 such as the line segment 8AL, so that working efficiency improves.

When the positions of the excavation edge portions P3 are indicated by the line segment 8AL, the operator can easily recognize the width of the bucket 8 based on the length of the line segment AL. Further, when the line segment AL indicates blade edges, and the length of the blade 8B upon use of the excavator 100 is taken in in the above step S1, the operator can proceed with construction work according to the design surface taking into account the degree of abrasion of the blade 8B.

Although an example has been described in the present embodiment where the top view 55a is displayed on the above fine excavation screen 55, the top view 55a may also be displayed on the rough excavation screen 53. In addition, the processing unit 44 according to the present embodiment displays the above top view 55a and side view 55b as a top view (a view seen in parallel to the Za axis) and a side view (a view seen in parallel to the Xa axis) in the vehicle main body coordinate system COM. The processing unit 44 may display at least one of the top view 55a and the side view 55b as a top view (a view seen in parallel to the Z axis) or a side view (a view seen in parallel to the X axis) in the global coordinate system.

Although the present embodiment has been described above, the above content by no means limits the present embodiment. Further, the above components incorporate components which one of ordinary skill in art can easily arrive at, which are the substantially same. Furthermore, the above components can be adequately combined. Still further, the components can be variously removed, replaced or changed without deviating from the spirit of the present embodiment.

For example, content of each guidance screen is not limited to the above and may be adequately changed. Further, part or all of functions of the display control device 39 may be executed by a computer provided outside the excavator 100. Furthermore, a target working object is not limited to the above surface, and may be a point, a line or a three-dimensional shape. The input unit 41 of the display input device 38 is not limited to a touch panel type, and may be formed with operation members such as hard keys and switches.

Although the work machine 2 has the boom 6, the arm 7 and the bucket 8 are provided in the above embodiment, the work machine 2 is not limited to this and only needs to have at least the bucket 8. Further, although the first stroke sensor 16, the second stroke sensor 17 and the third stroke sensor 18 detect tilt angles of the boom 6, the arm 7 and the bucket 8 in the above embodiment, a detection unit which detects tilt angles is not limited to these. For example, angle sensors which detect tilt angles of the boom 6, the arm 7 and the bucket 8 may be provided.

Although the bucket 8 is provided in the above embodiment, the bucket is not limited to this and may be a tilt bucket. The tilt bucket is a bucket which has a bucket tilt cylinder, which molds and level an inclined surface or a flat surface into a desirable shape by tilting the bucket to the left and the right even when an excavator is on a titled surface, and which can also perform a rolling compaction operation using a bottom plate.

REFERENCE SIGNS LIST

1 Vehicle Main Body
2 Work machine
3 Upper Swing Body
4 Cab
5 Traveling Device
8 Bucket
8B Blade
19 Work machine Condition detection unit
21, 22 Antenna
23 Three-Dimensional Position Sensor
24 Tilt Angle Sensor
28 Excavating Machine Display System (Display System)
38 Display Input Device
39 Display Control Device
41 Input Unit
42 Display Unit
42P Screen
43 Memory Unit
44 Processing Unit
45 Design Surface
46 Sound Generating Device
70 Target Surface
78, 79 Line Indicating Cross Section of Target Surface
84 Graphic Information
100 Excavator
P3 Excavation edge portion

The invention claimed is:

1. A display system of an excavating machine, the excavating machine comprising a work machine which includes a bucket including an excavation edge portion and a main body which is attached to the work machine, the excavating machine display system comprising:
a work machine condition detection unit which detects information related to a current position of the excavating machine, information related to a posture of the main body and information about a position of the excavation edge portion;
a memory unit which stores position information about a target surface which indicates a design geography and outer shape information about the bucket; and
a processing unit which calculates positions of the bucket and the excavation edge portion viewed from a top face of the excavating machine based on the information related to the current position of the excavating machine, the information related to the posture of the main body, the information about the position of the excavation edge portion and the outer shape information about the bucket, and displays on a screen of a display device the target surface, an image which indicates the bucket and an image which indicates the position of the excavation edge portion,
wherein even when the excavation edge portion comes to a position at which the excavation edge portion cannot be originally viewed from a top due to an outer shape of the bucket, the processing unit displays at all times the image which indicates the position of the excavation edge portion preferentially over the image which indicates the bucket, on the screen which displays the excavating machine from the top face of the excavating machine such that a relative position of the excavation edge portion with respect to the image which indicates the bucket viewed from the top face is intelligible.

2. The display system of the excavating machine according to claim 1, wherein the processing unit displays the image which indicates the position of the excavation edge portion as an image of a line segment which indicates the position of the excavation edge portion, and displays the image of the line segment which indicates the position of the excavation edge portion in a mode different from that of the image which indicates the bucket.

3. The display system of the excavating machine according to claim 2, wherein the line segment indicates a blade edge at the excavation edge portion.

4. The display system of the excavating machine according to claim 1, wherein a display layer of the image which indicates the position of the excavation edge portion is displayed over a display layer of the image which indicates the bucket.

5. The display system of the excavating machine according to claim 1, wherein transparency processing of at least part of the image which indicates the bucket which overlaps the image which indicates the position of the excavation edge portion is performed to be displayed.

6. An excavating machine comprising a display system of the excavating machine the excavating machine comprising a work machine which includes a bucket including an excavation edge portion and a main body which is attached to the work machine, the excavating machine display system comprising:
a work machine condition detection unit which detects information related to a current position of the excavating machine, information related to a posture of the main body and information about a position of the excavation edge portion;
a memory unit which stores position information about a target surface which indicates a design geography and outer shape information about the bucket; and
a processing unit which calculates positions of the bucket and the excavation edge portion viewed from a top face of the excavating machine based on the information related to the current position of the excavating machine, the information related to the posture of the main body, the information about the position of the excavation edge portion and the outer shape information about the bucket, and displays on a screen of a display device the target surface, an image which indicates the bucket and an image which indicates the position of the excavation edge portion, wherein even when the excavation edge portion comes to a position at which the excavation edge portion cannot be originally viewed from a top due to an outer shape of the bucket, the processing unit displays at all times the image which indicates the position of the excavation edge portion preferentially over the image which indicates the bucket, on the screen which displays the excavating machine from the top face of the excavating machine such that a relative position of the excavation edge portion with respect to the image which indicates the bucket viewed from the top face is intelligible.

* * * * *